United States Patent [19]
Matte

[11] Patent Number: 5,746,054
[45] Date of Patent: May 5, 1998

[54] METHOD AND APPARATUS FOR TUNED PIPE WATER INJECTION

[75] Inventor: Sylvain Matte, St-Denis De Brompton, Canada

[73] Assignee: Bombardier, Inc., Montreal, Canada

[21] Appl. No.: 640,500

[22] Filed: May 1, 1996

[51] Int. Cl.$^6$ .............................. F01N 3/04; F02B 27/02
[52] U.S. Cl. .................. 60/310; 60/312; 60/314; 440/89
[58] Field of Search ................. 60/273, 310, 312, 60/313, 314; 440/89

[56] References Cited

U.S. PATENT DOCUMENTS

| | | | |
|---|---|---|---|
| 3,385,052 | 5/1968 | Holtermann et al. | 60/30 |
| 3,726,092 | 4/1973 | Raczuk | 60/314 |
| 4,350,010 | 9/1982 | Yukishima | 60/312 |
| 4,920,745 | 5/1990 | Gilbert | 60/273 |
| 5,161,372 | 11/1992 | Whipple | 60/310 |
| 5,502,963 | 4/1996 | Inaba | 60/314 |

*Primary Examiner*—Sheldon Richter
*Attorney, Agent, or Firm*—Fish & Neave; Jeffrey H. Ingerman

[57] ABSTRACT

In an exhaust expansion chamber or tuned pipe of a two-cycle engine in a watercraft, variable amounts of water are injected, thus cooling the temperature within the expansion chamber and matching the sonic wave speed with that of the correct rpm of the motor. Thus, by regulating the temperature of the exhaust gases in the tuned pipe with water, the efficiency of the two-cycle engine at varying revolutions per minute, is improved.

5 Claims, 9 Drawing Sheets

METHOD AND APPARATUS FOR TUNED PIPE WATER INJECTION

FIELD OF THE INVENTION

This invention relates to two-cycle engines and more particularly to improving the efficiency of two-cycle engines in watercraft at different speeds.

BACKGROUND

Two-cycle engines require an expansion chamber in the exhaust system. When the exhaust port of the engine opens, hot exhaust gases are emitted and a negative pressure wave moves all the way through the exhaust system. Just prior to the exhaust port closing the engine must receive a positive pressure wave, to maximize its efficiency.

To accomplish this, a tuned pipe is attached to the exhaust manifold. Typically, beginning at the manifold, it has a first head portion, then a divergent portion, a central or constant diameter portion, and a convergent tail cone. The positive pressure wave of exhaust gases leaves the exhaust port and moves quickly along the expansion chamber creating a negative pressure behind, that phenomenon increasing the pressure differential between the pressure in the cylinder and the pressure in the exhaust manifold, improving the exhaust gas flow. When the pressure wave reaches the convergent tail cone, parts of the pressure wave will reverse direction and provide a positive wave back in the direction of the exhaust port. This phenomenon reacts like a sonic wave. If an engine runs at revolutions per minute greater than the tuned pipe capabilities, the negative and positive pressure waves become out of time and the efficiency of the two-cycle engine is decreased.

A sonic wave moves at the speed of sound, and the speed of sound varies with the density of the gases and the temperature. Thus, the greater the density of exhaust gases and the higher the temperature within the tuned pipe, the faster the speed of sound and thus, the faster the sonic waves will travel. Thus, in prior art engines, in order to maximize efficiency, a tuned pipe is made a certain length which will put the sonic wave in synchronization with the desired rpms of the motor. Thus, maximum efficiency at desired speed or rpms will result.

In light of the foregoing, one would think that it is simply a matter of lengthening the tuned pipe to have the desired synchronization of the positive and negative pressure waves. Unfortunately, this is not always possible due to space constraints.

The inventor of the present invention, through experimentation, has found, however, that the tuned pipe can be shortened provided that the speed of sound within the pipe is lowered.

It has also been found that by cooling the exhaust gases in the tuned pipe the speed of sound is lowered. The inventor of the present invention has also found that by injecting water into the tuned pipe, the exhaust gases are cooled, the speed of sound is lowered, and the pipe shortened. Furthermore, it has also been found that the lower the rpm of the motor, the cooler the exhaust gases should be to maximize efficiency. Thus, when more water is injected into the tuned pipe, efficiency at lower rpms can be increased.

In a typical watercraft manufactured by the inventor's employer, the desired rpms or revolutions per minute is 6750. For example, in a 787 cc engine, it has also been found that if approximately 1.5 liters of water per minute are added to the tuned pipe at 6750 rpms, the sonic wave is in close to perfect synchronization with the exhaust port closure and opening, and efficiency is maximized.

In a personal watercraft having a jet pump as the means for propulsion, the liquid for the cooling system for the motor and exhaust pipe, is provided by pressurized water from the rotation of the jet pump. The speed of rotation of the jet pump is directly proportional to the rpm of the motor. Pressurized water for injecting water into the tuned pipe is also provided by the jet pump. Thus, the higher the revolutions per minute of the motor, the higher the pump pressure, and the greater the amount of water available for injection.

Prior to the creation of the present invention, the typical method of lowering the speed of the sonic wave by cooling the exhaust gases in the tuned pipe was to have an injection pressure line connected directly from the pump to an orifice of an injector in the tuned pipe. Thus, the greater the rpms of the motor, the greater the pressure of the water created by the pumps, and the greater amount of water forced into the tuned pipe. The injector used an orifice of a diameter that would deliver approximately 1.5 liters of water per minute to the tuned pipe at maximum rpms of 6750, thus, creating maximum fuel savings and efficiency at the desired speed of the watercraft.

As was mentioned earlier, however, it has been found that to maximize efficiency at lower rpms the speed of the sonic wave must be lowered, and that has to be done by cooling the exhaust gases to a greater degree. Thus, more water has to be added to the tuned pipe at lower rpms to maximize efficiency.

It is therefore an object of the present invention to provide a method and an apparatus to regulate the quantity of water entering the tuned pipe at varying rpms.

In a preferred embodiment of the present invention, this is accomplished by installing a pressure regulator between the tuned pipe water injection line and the jet pump pressure hose. By creating a larger injector orifice, and by lowering the available water pressure for forcing water through the orifice into the tuned pipe, and matching the correct amount of water flowing into the tuned pipe at maximum rpms, maximum efficiency for a larger range of rpms can be achieved.

Therefore, this invention seeks to provide an apparatus for improving the efficiency of a two-cycle engine comprising: a source of pressurized water; a pressurized water conduit; a pressurized water regulator; a water injector conduit; and a water injector; said water injector including an orifice adapted, in operation, to inject water into a tuned pipe of an exhaust system of said two-cycle engine; said source of pressurized water being in open communication with said pressurized water regulator by means of said pressurized water conduit; and said water injector being in open communication with said pressurized water regulator by means of said water injector conduit, whereby, in operation, the quantity of water injected per minute into said tuned pipe at different revolutions of said two-cycle engine, is proportional to the water pressure in said pressurized water conduit, up to a predetermined speed of said two-cycle engine; and thereafter, at greater speeds of said two-cycle engine, said quantity of water injected per minute into said tuned pipe is regulated by said pressurized water regulator such that water pressure in said water injector conduit is less than said water pressure in said pressurized water conduit; and said quantity of water injected into said tuned pipe is not proportional to the speed of said two-cycle engine.

The invention also seeks to provide a method of improving efficiency in a two-cycle engine over a broad range of engine speeds by controlling a speed of a sonic wave in a tuned pipe of an exhaust system of said engine comprising the steps of: 1) injecting a predetermined quantity of water per minute into said tuned pipe when said engine operates at its maximum revolutions per minute; 2) proportionately increasing said quantity of water per minute injected into said tuned pipe as said engine speed decreases until a lower predetermined engine speed is reached; 3) proportionately decreasing said quantity of water per minute injected into said tuned pipe as engine speed decreases below said predetermined engine speed; and 4) adjusting said quantity of water per minute injected into said tuned pipe by varying the pressure of water available at an injection orifice in said tuned pipe.

More particularly, the present invention provides an independent pressure line from the pump leading to the pressure regulator. The remainder of the pump pressure line is directed to the cooling jacket around the tuned pipe, the manifold and the engine. A separate line connects the pressure regulator to the injector orifice in the tuned pipe.

In a preferred embodiment, for example in a 787 cc engine, the water pressure in the water injector line is permitted to rise along with the pump pressure until it reaches approximately 100 mbar, at approximately 4250 rpms. From 4250 rpms to maximum rpms the injection water pressure leaving the pressure regulator is maintained at approximately the same level, such that the water flow into the tuned pipe at 6750 rpms is approximately 1.5 liters per minute.

Although constant pressure in the water injection line is maintained between 4250 rpms and 6570 rpms, the water quantity inflow into the tuned pipe will increase as motor rpms are lowered. The reason for this is that the back pressure in the tuned pipe created by the exhaust gases also lowers with lower rpms, and thus at approximately 4250 rpms the amount of water entering the tuned pipe and cooling the exhaust gases thus, slowing down the sonic wave, is significantly increased from the higher rpms; thus, increasing motor efficiency over a greater range. In fact, the amount of water entering the tuned pipe at approximately 3750 rpms is about the same as that entering the tuned pipe at 6750 rpms. But since the temperature of the exhaust gases is considerably less, the efficiency over a broad range of rpms is increased and gas consumption is lowered.

The invention will be described in greater detail in connection with the following drawings and graphs wherein.

DETAILED DESCRIPTION OF THE DRAWINGS

Figure 1:
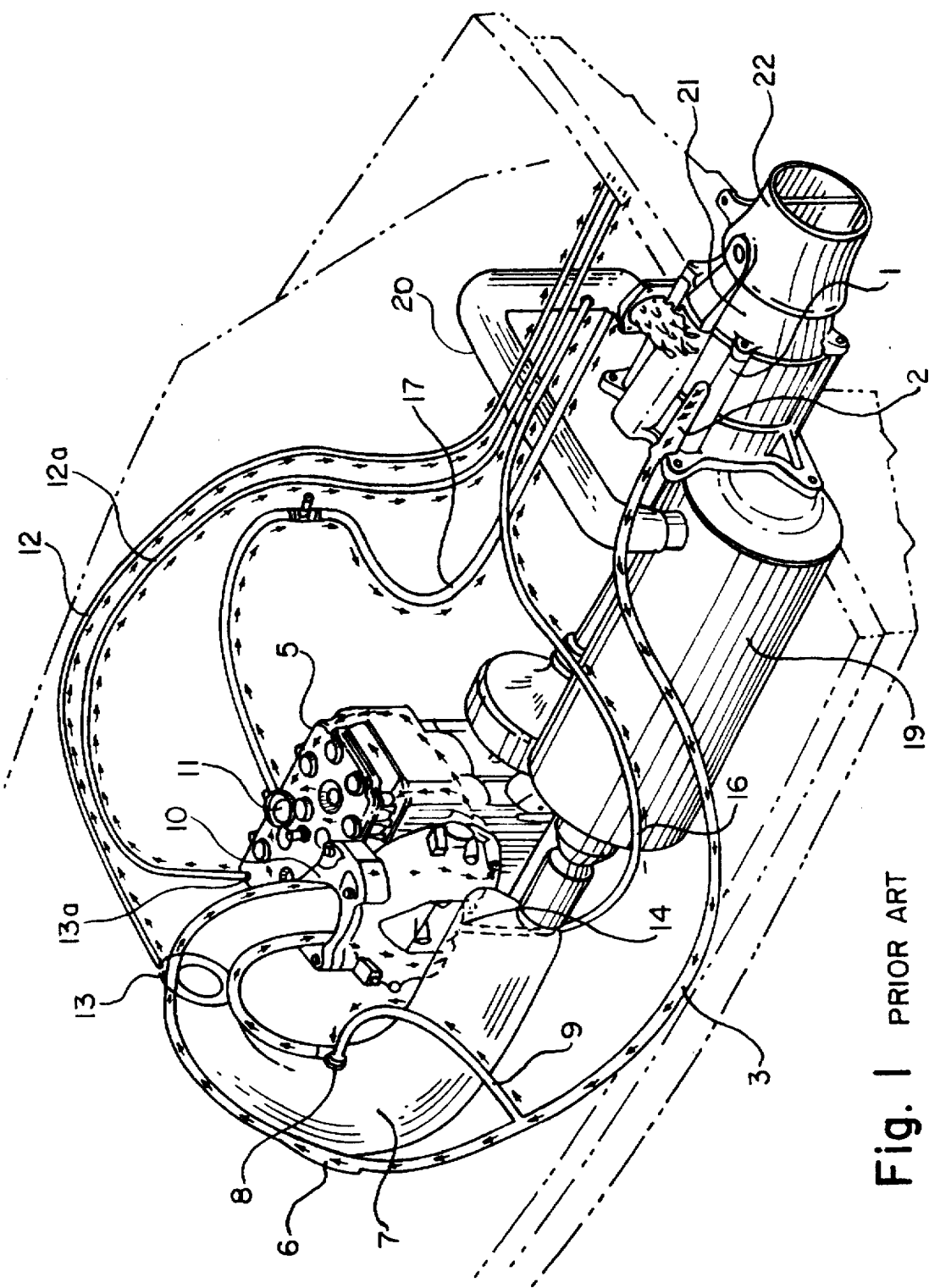
FIG. 1 is a schematic drawing of the cooling system of a prior art personal watercraft.

FIG. 1 is a schematic drawing showing the cooling system and water injection system of a typical prior art personal watercraft. A jet pump 1 delivers pressurized water to a cooling system supply outflow port 2. The water travels towards the motor and exhaust system through a cooling system hose 3. Water enters a cooling jacket 6 which surrounds a tuned pipe 7. Coolant then travels around the engine manifold 10 and into the cooling system of motor 5. A separate inflow bypass hose 9 injects water through injector 8 into the tuned pipe 7. The water being injected into the tuned pipe 7 is at a pressure directly related to the pressurized water being delivered by jet pump 1. Coolant which has passed through the engine leaves through engine cooling system outlet 11, and through cooling system outflow hose 17, which is dispersed into the exhaust and out at the rear of the boat.

The system also contains an engine water drain outlet marked 14. This is located at the lowest portion of the cooling system and helps to drain the motor when necessary through outlet hose 16. The system is also equipped with air bleeder outlets 13 and 13A which are located at the highest point on each of the top of the tuned pipe and top of the motor. Air can be bled out of the system by means of tuned pipe air bleed hose 12 and engine air bleed hose 12A. Exhaust gases travel through manifold 10 through tuned pipe 7 to muffler 19, and out exhaust tail pipe 20. Also shown in FIG. 1 are jet-pump venturi 21 and steering nozzle 22.

Figure 2:
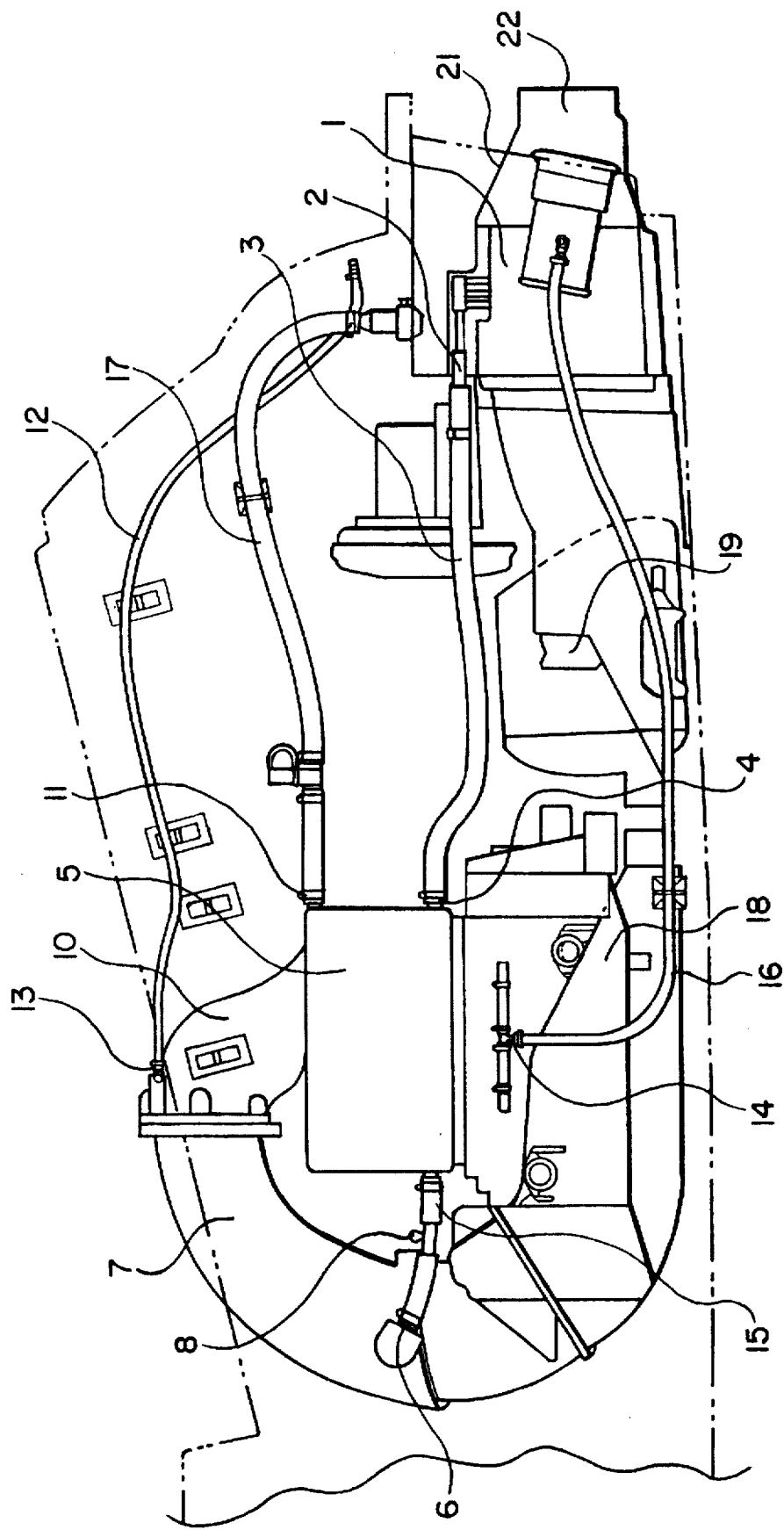
FIG. 2 is a side view of a schematic drawing of the cooling system of a prior art watercraft.

FIG. 2 is a side view in greater detail of the cooling and injection system of a prior art jet propelled watercraft. The numerals are similar to those in FIG. 1, however, there are some additional parts shown. One notes, for example, that tuned pipe 7 has a convergent tail cone portion 18. This pipe 7 will later be explained in conjunction with other drawings. Also shown, is engine water cooling system inlet 4 and engine water cooling system outlet 11. Also shown is the continuation of pump pressure hose 3 after it passes by the engine to water jacket cooling hose 15.

Figure 3:
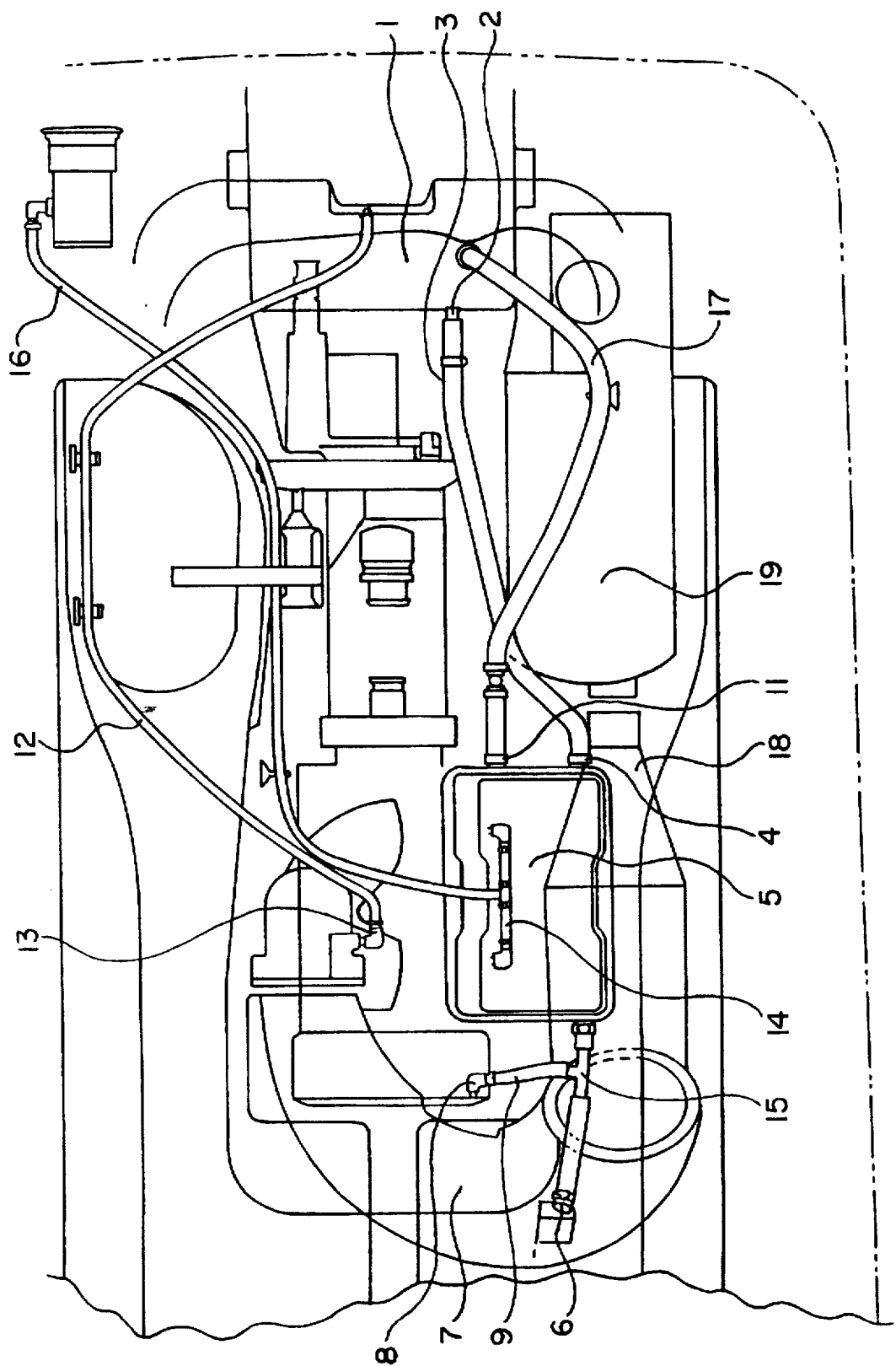
FIG. 3 is a top view of the cooling system of FIG. 2.

FIG. 3 is a top view of the same cooling system and injection configuration as FIG. 2, using similar numerals. As previously explained, in both FIGS. 2 and 3, water injected through injector 8 into tuned pipe 7 is completely dependent upon pressurized water passing from pump pressure outlet 2 through pump pressure line 3, to injector hose line 9. Pump pressure is dependent upon the revolutions per minute of the pump which are dependent upon the revolutions per minute of the engine 5. Thus, the faster the engine speed, the higher the pressure of the water, and the greater the quantity of water introduced into the tuned pipe 7.

Thus, in a prior art boat, the injector orifice is of a diameter such that the prefect amount of water enters the tuned pipe 7 when the engine is at its highest speed; thereby maximizing the efficiency of the engine only at its maximum rpms. This, unfortunately, is contrary to the inventor's findings that the lower the engine speed, the shorter the sonic wave should be to give maximum efficiency. Thus, it is preferable to have more water enter the tuned pipe 7 at lower rpms than higher rpms to gain greater efficiencies over a broader range.

Figure 4:
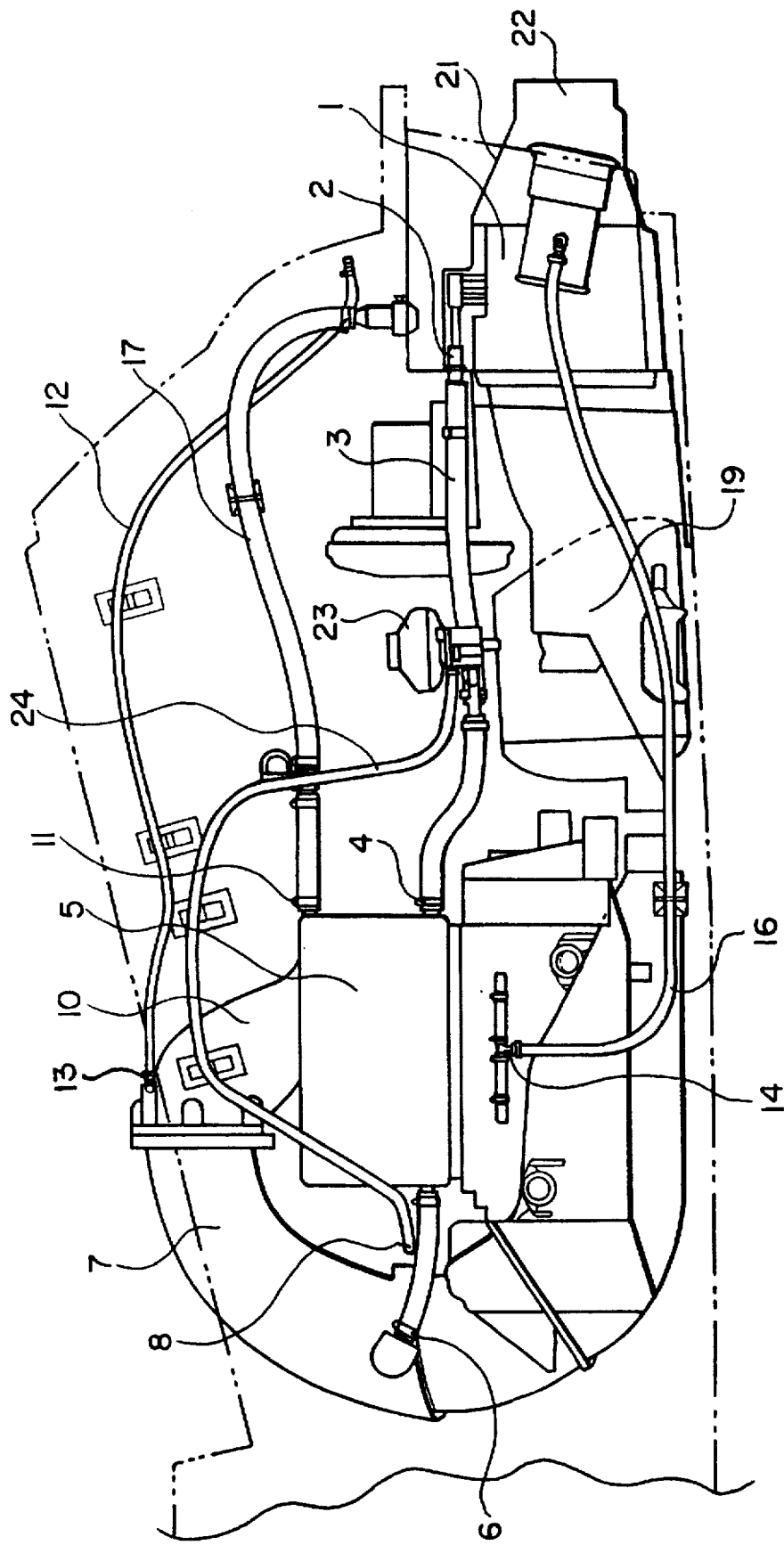
FIG. 4 is a side view of the cooling and injection system of the present invention.

A preferred embodiment of the invention is shown in FIG. 4. This is a side view of the cooling and injection system of the present invention. One notes that interposed between pump pressure line 3 and engine cooling system water inlet 4 is a pressure regulator 23. A portion of the water from pump pressure cooling system hose 3 is diverted through pressure regulator 23 such that the pressurized water leaving the pressure regulator through injection pressure line 24 is regulated. Injector pressure line 24 leads to injector 8. Thus, in operation, the amount of water entering tuned pipe 7 through injector 8 is no longer dependent upon the pressure existing in pump pressure line 3. Thus, lesser amounts of water can be injected at higher rpms, and greater amounts of water can be introduced into the tuned pipe 7 at lower engine speeds.

Figure 5:
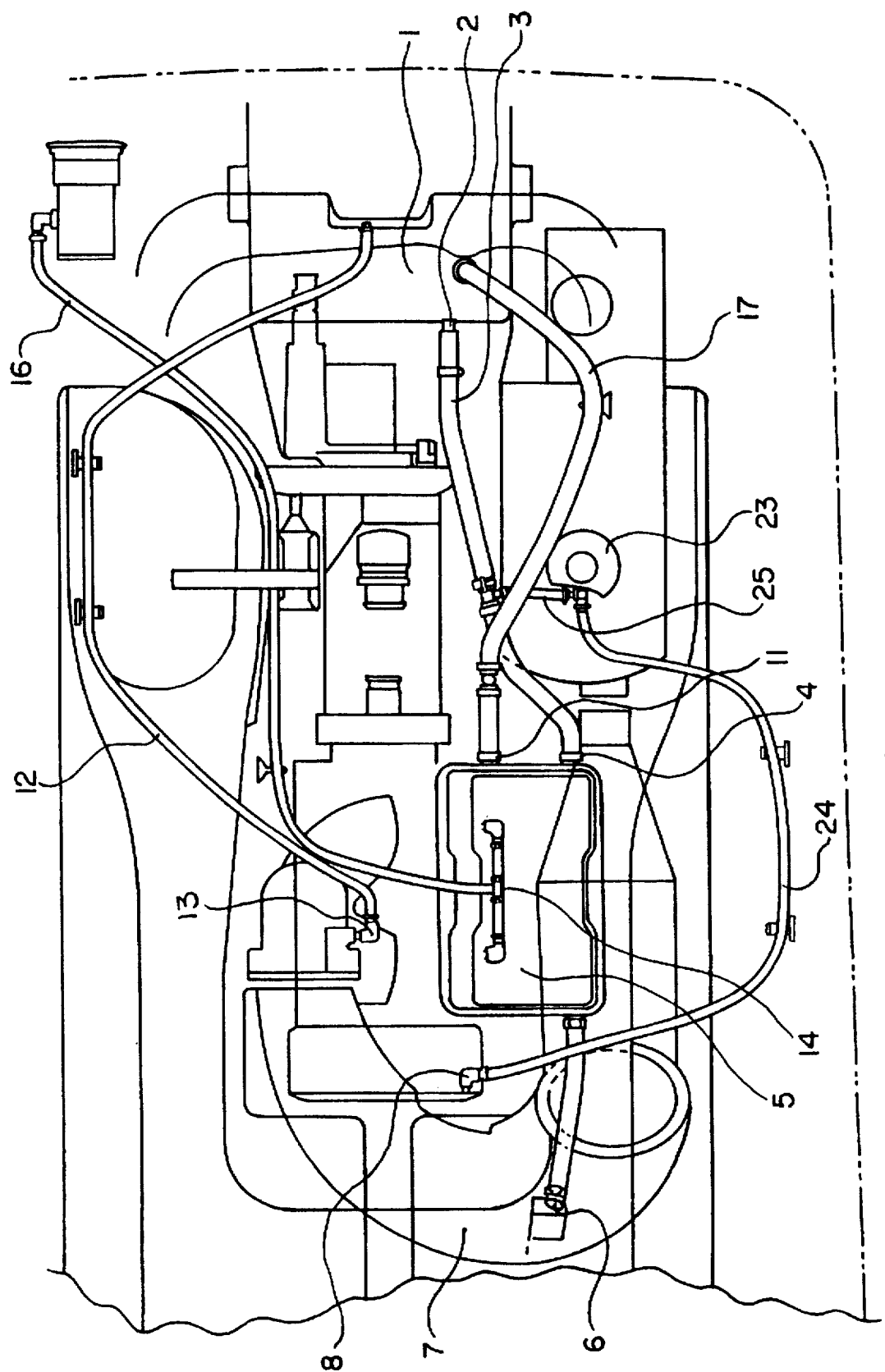
FIG. 5 is a top view of FIG. 4.

FIG. 5 is a top schematic view of the cooling system and injection system of the present invention. One notes that there is a pressure regulator line 25 which joins pump pressure line 3 in a T. Line 25 feeds solely the pressure controller/regulator 23.

Figure 6:
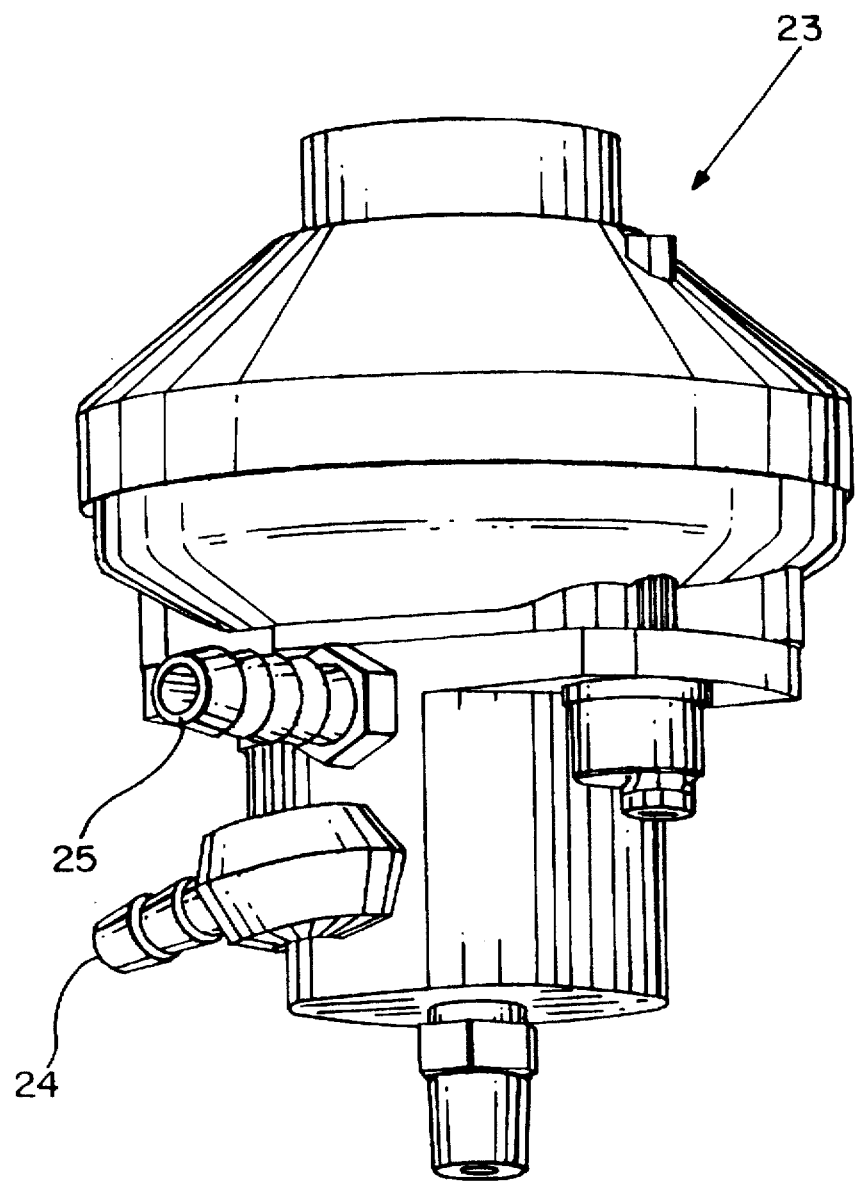
FIG. 6 is a perspective view of the pressure regulator of the present invention.

FIG. 6 is a perspective view of a pressure controller/ regulator of the present invention. Although any number of pressure regulators can be used, the preferred pressure regulator is shown in FIG. 6. Water enters the pressure regulator at 25 and leaves through 24.

Figure 7:
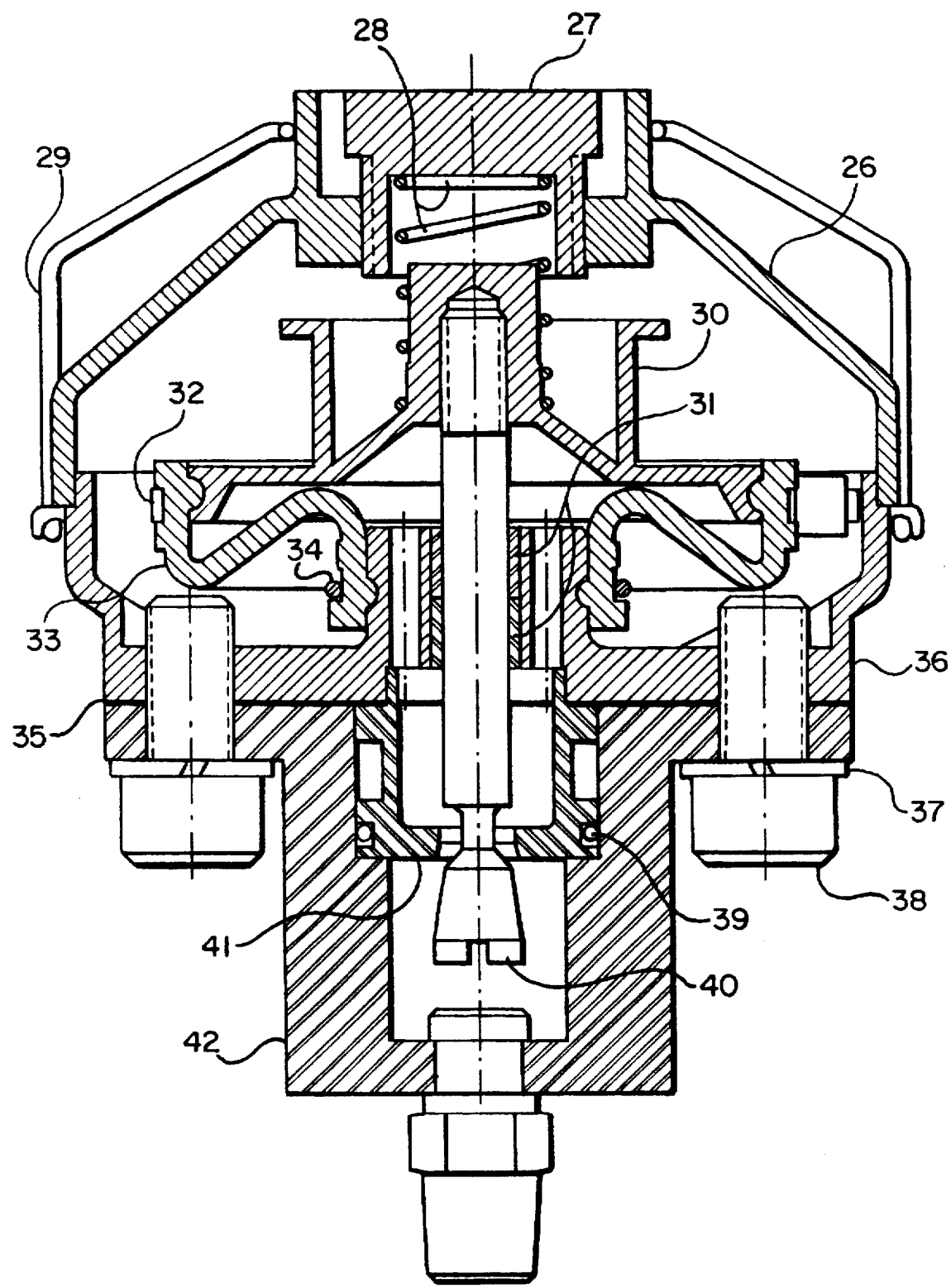
FIG. 7 is a transverse cross section VII.VII of FIG. 6.

FIG. 7 is a transverse cross section of the pressure regulator of the present invention. The pressure regulator has a cover 26 and an upper pressure adjustor screw 27. Beneath pressure adjuster screw 27 is a spring 28. Cover 26 is kept in place by a tension spring 29. Beneath the cover 26 of the pressure regulator is a piston 30, surrounded by a seal 31. Ring seal 32 surrounds arm 33. In addition there is an O-ring seal 34. The regulator has a base 36 and a housing 42. Gasket 35 seals regulator base 36 and housing 42. The regulator can be taken apart by removing socket head screws 38, which employ lock washers 37. Flow plunger 40 is located within flow housing 41. An O-ring 39 seals the piston from the housing.

Figure 8:
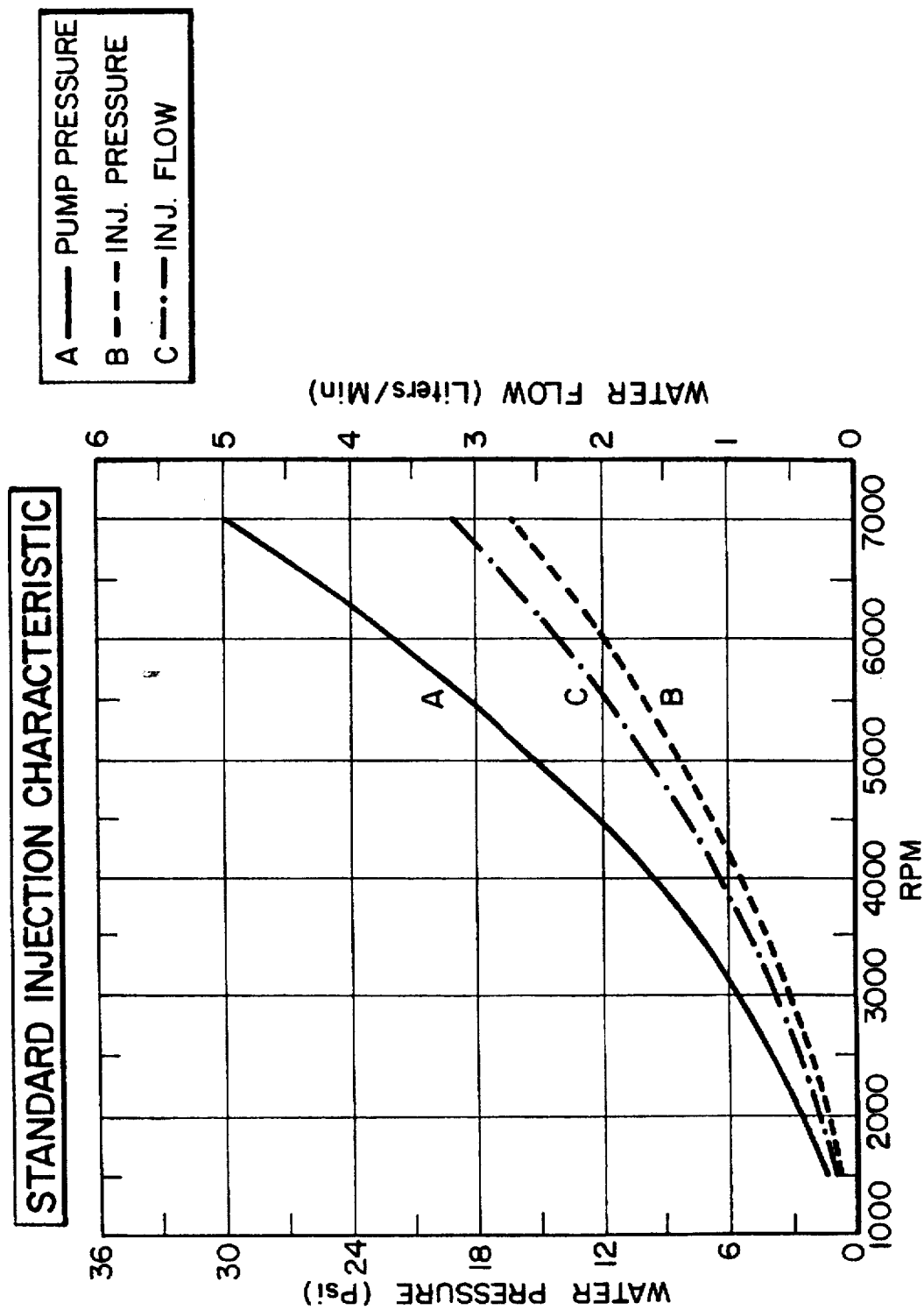
FIG. 8 is a graph showing standard injection water inflow of a prior art injection system.

FIG. 8 is a graph showing standard injection characteristics of a prior art watercraft as viewed in drawings 1, 2 and 3. One notes that as pump pressure A increases with the rpms of the motor, so does injection pressure B, and consequently the water flow through the injector as measured in liters per minute. Thus, the maximum water inflow occurs at the highest rpms, namely 7000.

Figure 9:
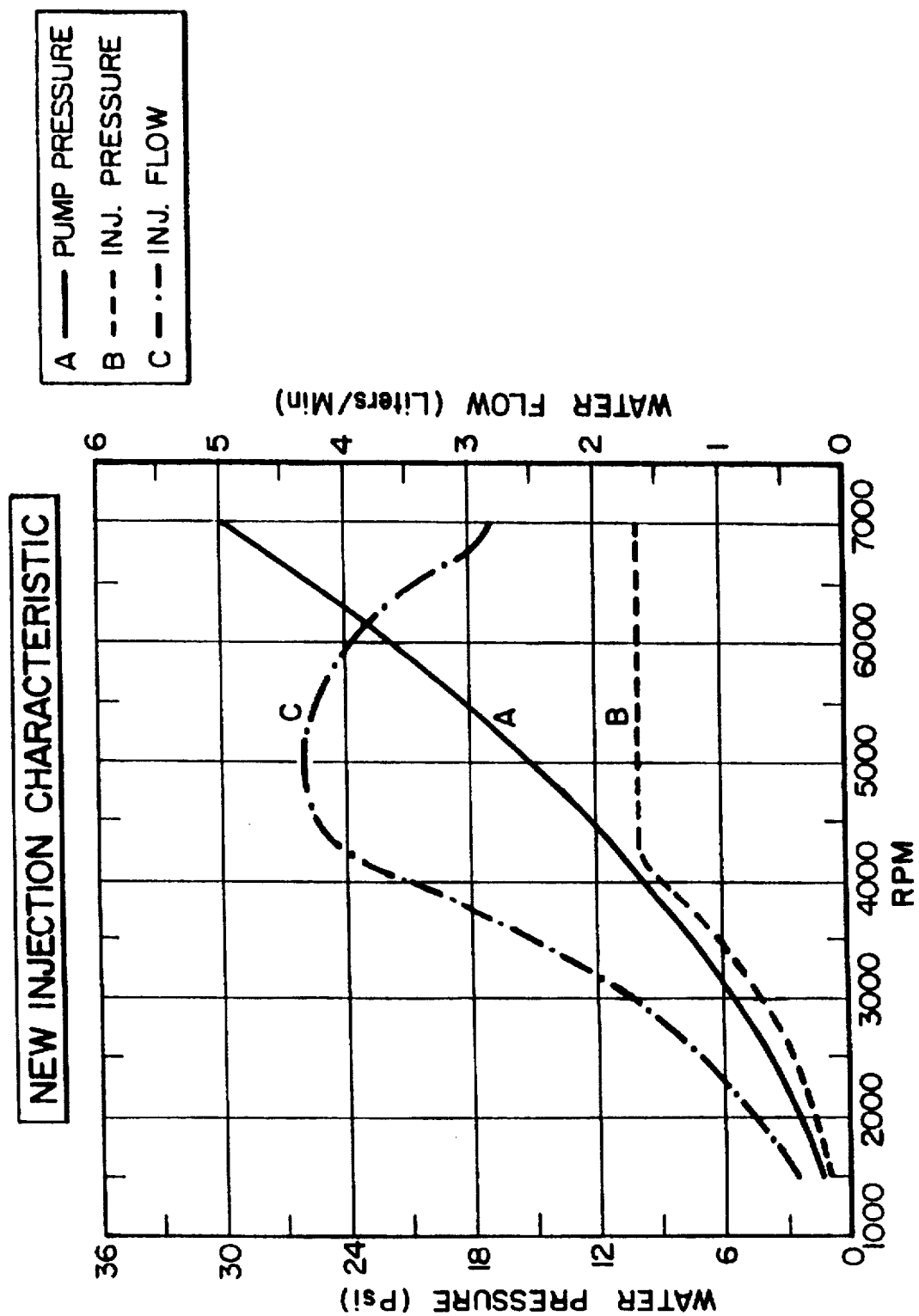
FIG. 9 is a graph showing the injection water inflow with the present invention.

In FIG. 9, the injection system of the present invention is characterized by pump pressure A, injection pressure B, and water injection inflow to the tuned pipe C. In a preferred embodiment, the injection line pressure (shown as B) begins to be regulated at 4250 rpms and is maintained at the same pounds per square inch to the maximum engine rpms. This pressure is approximately 100 mbar or 10 psi. One notes that pump pressure A continues to increase with rpms in a manner similar to that as shown in the graph of FIG. 8.

Interestingly, the injection inflow C is greater at the lower rpm of 5000 than it is at the maximum engine rpm of 7000. The reason for this phenomenon is that even though injection pressure B is kept constant, the water inflow C increases at lower rpms because the back pressure from the exhaust gases is lower at lower rpms, thus, more water is able to enter into the tuned pipe. In operation, more water further cools the exhaust gases, lowering the speed of sound, and shortening the sonic wave so that the sonic wave is in tune with the exhaust port opening and closure at lower rpms. In this manner, the present invention increases the efficiency of the motor, from approximately 1500 rpms to 6750 rpms. One notes that at maximum rpms the water inflow is approximately the same as in the graph in drawing 8, and thus efficiency at maximum rpms is maintained.

In conclusion, controlling the pressure of the pressurized water to the injector, at higher rpms and using a larger orifice for the injector, increases the water inflow into the tuned pipe as the rpms lower thereby maximizing the efficiency of the motor over a larger range of rpms by having the negative and positive waves in the tuned pipe synchronized with the exhaust port closure and opening.

What I claim as my invention is:

1. An apparatus for improving the efficiency of a two-cycle engine in a jet pump propelled watercraft, said apparatus comprising:

a source of pressurized water comprising the impeller of a jet pump adapted to propel water in a watercraft;

a pressurized water conduit;

a pressurized water regulator;

a water injector conduit; and a water injector;

said water injector including an orifice adapted, in operation, to inject water into a tuned pipe of an exhaust system of said two-cycle engine;

said source of pressurized water being in open communication with said pressurized water regulator by means of said pressurized water conduit; and said water injector being in open communication with said pressurized water regulator by means of said water injector conduit, whereby, in operation, the quantity of water injected per minute into said tuned pipe at different revolutions of said two-cycle engine, is proportional to the water pressure in said pressurized water conduit, up to a predetermined speed of said two-cycle engine;

and thereafter, at greater speeds of said two-cycle engine, said quantity of water injected per minute into said tuned pipe is regulated by said pressurized water regulator such that water pressure in said water injector conduit is less than said water pressure in said pressurized water conduit;

and said quantity of water injected into said tuned pipe is not proportional to the speed of said two-cycle engine.

2. An apparatus for improving the efficiency of a two-cycle engine in a jet pump propelled watercraft, said apparatus comprising:

a source of pressurized water comprising the impeller of a jet pump adapted to propel water in a watercraft;

a pressurized water conduit;

a pressurized water regulator;

a water injector conduit; and a water injector;

said water injector including an orifice adapted, in operation, to inject water into a tuned pipe of an exhaust system of said two-cycle engine;

said source of pressurized water being in open communication with said pressurized water regulator by means of said pressurized water conduit; and said water injector being in open communication with said pressurized water regulator by means of said water injector conduit, whereby, in operation, water is injected into said tuned pipe at all engine speeds when said engine is activated; and the quantity of water injected per minute into said tuned pipe at different revolutions of said two-cycle engine being proportional to the water pressure in said pressurized water conduit, up to a predetermined speed of said two-cycle engine;

and thereafter, at greater speeds of said two-cycle engine, said quantity of water injected per minute into said tuned pipe is regulated by said pressurized water regulator such that water pressure in said water injector conduit is less than said water pressure in said pressurized water conduit;

and said quantity of water injected into said tuned pipe is not proportional to the speed of said two-cycle engine.

3. An apparatus for improving the efficiency of a two-cycle engine in a jet pump propelled watercraft, said apparatus comprising:

a source of pressurized water comprising the impeller of a jet pump adapted to propel water in a watercraft;

a pressurized water conduit;

a pressurized water regulator;

a water injector conduit; and a water injector;

said water injector including an orifice adapted, in operation, to inject water into a tuned pipe of an exhaust system of said two-cycle engine;

said source of pressurized water being in open communication with said pressurized water regulator by means of said pressurized water conduit; and said water injector being in open communication with said pressurized water regulator by means of said water injector conduit, whereby, in operation, water is injected into said tuned pipe at all engine speeds when said engine is activated; and the quantity of water injected per minute into said tuned pipe at different revolutions of said two-cycle engine, being proportional to the water pressure in said pressurized water conduit, up to a predetermined speed of said two-cycle engine;

and thereafter, at greater speeds of said two-cycle engine, said quantity of water injected per minute into said tuned pipe is regulated by said pressurized water regulator such that water pressure in said water injector conduit is less than said water pressure in said pressurized water conduit;

and said quantity of water injected into said tuned pipe is not proportional to the speed of said two-cycle engine, such that in operation, when said engine revolves at said predetermined speed, the greatest quantity of water is injected per minute into said tuned pipe, and when said engine revolves at higher or lower engine speeds, lesser amounts of water are injected per minute into said tuned pipe.

4. An apparatus as claimed in claim 3, wherein, in operation, said water pressure in said water injector conduit is maintained at a constant by said pressurized water regulator when said engine speed is between approximately 4250 revolutions per minute and 7000 revolutions per minute.

5. An apparatus as claimed in claim 4, wherein, in operation, said water pressure in said water injector conduit is maintained between 8 and 10 pounds per square inch when said engine speed is between approximately 4250 revolutions per minute and 7000 revolutions per minute.

* * * * *